(12) United States Patent
Vogt et al.

(10) Patent No.: US 11,204,442 B2
(45) Date of Patent: Dec. 21, 2021

(54) IMPLEMENTING FREE ADVECTION IN BASIN MODELING

(71) Applicant: SCHLUMBERGER TECHNOLOGY CORPORATION, Sugar Land, TX (US)

(72) Inventors: Christian Vogt, Aachen (DE); Adrian Kleine, Aachen (DE)

(73) Assignee: Schlumberger Technology Corporation, Sugar Land, TX (US)

( * ) Notice: Subject to any disclaimer, the term of this patent is extended or adjusted under 35 U.S.C. 154(b) by 259 days.

(21) Appl. No.: 16/309,925

(22) PCT Filed: Jun. 24, 2016

(86) PCT No.: PCT/US2016/039120
§ 371 (c)(1),
(2) Date: Dec. 13, 2018

(87) PCT Pub. No.: WO2017/222539
PCT Pub. Date: Dec. 28, 2017

(65) Prior Publication Data
US 2019/0146119 A1    May 16, 2019

(51) Int. Cl.
*G01V 99/00* (2009.01)
*G01V 1/30* (2006.01)

(52) U.S. Cl.
CPC ............ *G01V 99/005* (2013.01); *G01V 1/301* (2013.01)

(58) Field of Classification Search
CPC ...... G01V 99/005; G01V 99/00; G01V 1/301; G01V 1/30; G01V 1/288; G01V 1/286; G01V 1/284; G01V 1/282; G01V 1/28
See application file for complete search history.

(56) References Cited

U.S. PATENT DOCUMENTS

| | | | | |
|---|---|---|---|---|
| 5,953,680 A | * | 9/1999 | Divies .................... | G01V 1/282 702/5 |
| 2009/0055141 A1 | * | 2/2009 | Moncorge ............... | E21B 49/00 703/2 |

(Continued)

OTHER PUBLICATIONS

Cherkaoui, et al., "Characteristics of high Rayleigh number two-dimensional convection in an open-top porous layer heated from below," Journal of Fluid Mechanics, 1999, vol. 394, pp. 241-260.

(Continued)

*Primary Examiner* — Mohamed Charioui
(74) *Attorney, Agent, or Firm* — Michael Guthrie

(57) ABSTRACT

A method for performing a field operation of a field. The method includes obtaining, for each cell in a data volume, a permeability measure to represent fluid passing ability in a corresponding location in the field, generating neighboring cell combinations based on each neighboring cell combination including a connected portion of the cells, and the permeability measure for each cell in the connected portion satisfying a pre-determined threshold, selecting, from the neighboring cell combinations and based at least on the permeability measure, a selected neighboring cell combination having an optimal combined free advection measure, wherein the selected neighboring cell combination corresponds to an advection candidate region of the field, generating an equivalent thermal conductivity for the advection candidate region, and performing, based at least on the equivalent thermal conductivity, a basin modeling of the field to generate a modeling result.

20 Claims, 7 Drawing Sheets

(56) References Cited

U.S. PATENT DOCUMENTS

| | | | |
|---|---|---|---|
| 2009/0265152 A1 | 10/2009 | Cacas et al. | |
| 2010/0076738 A1 | 3/2010 | Dean et al. | |
| 2010/0223039 A1* | 9/2010 | Maliassov | G01V 99/00 703/2 |
| 2012/0221302 A1 | 8/2012 | Lewandowski et al. | |
| 2013/0041633 A1* | 2/2013 | Hoteit | E21B 43/00 703/2 |
| 2014/0136171 A1 | 5/2014 | Sword, Jr. et al. | |
| 2015/0100293 A1 | 4/2015 | Hoteit et al. | |
| 2015/0113379 A1* | 4/2015 | Wakefield | G06T 17/05 715/227 |

OTHER PUBLICATIONS

Espitalie, et al. "Primary Cracking of kerogens. Experimenting and modeling C1, C2-C5, C6-C15 and C15+ classes of hydrocarbons formed," Advances in Organic Geochemistry, 1988, vol. 13, Nos. 4-6, pp. 893-899.

Hantschel, et al., "Fundamentals of Basin and Petroleum Systems Modeling," Springer, Berlin, Apr. 10, 2009.

Schmeling, et al., "A scaling law for approximating porous hydrothermal convection by an equivalent thermal conductivity: theory and application to the cooling oceanic lithosphere," Geophysical Journal International, 2014, vol. 197, pp. 645-664.

International Search Report and Written Opinion for the equivalent International patent application PCT/US2016/039120 dated Mar. 13, 2017.

International Preliminary Report on Patentability for the equivalent International patent application PCT/US2016/039120 dated Jan. 3, 2019.

Extended European Search Report dated Jan. 10, 2020 in counterpart European Patent Application No. 16906458.1, 8 pages.

Communication pursuant to Article 94(3) EPC dated Mar. 5, 2021 in counterpart European Patent Appliation No. 16906458.1, 4 pages.

* cited by examiner

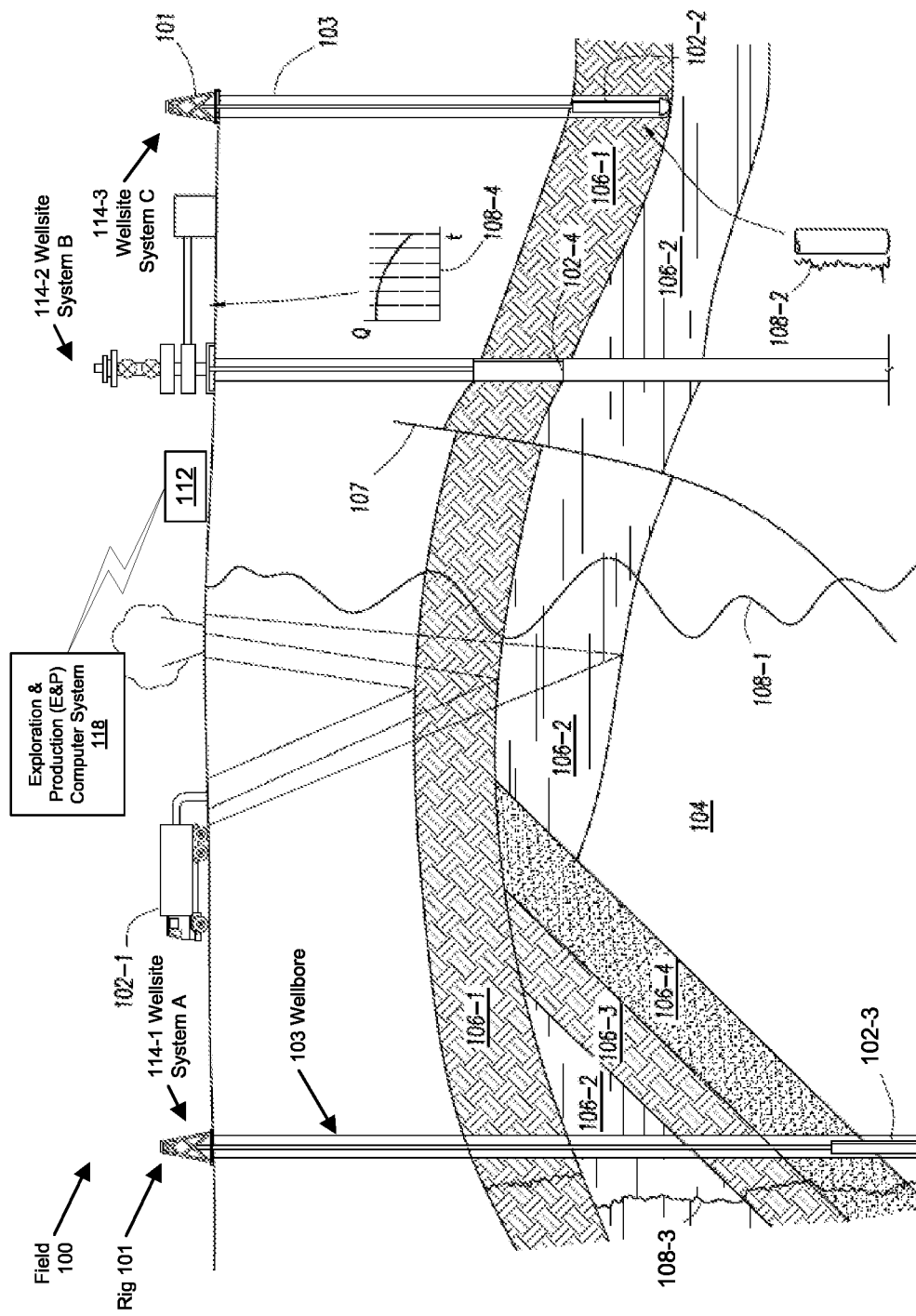
FIG. 1.1

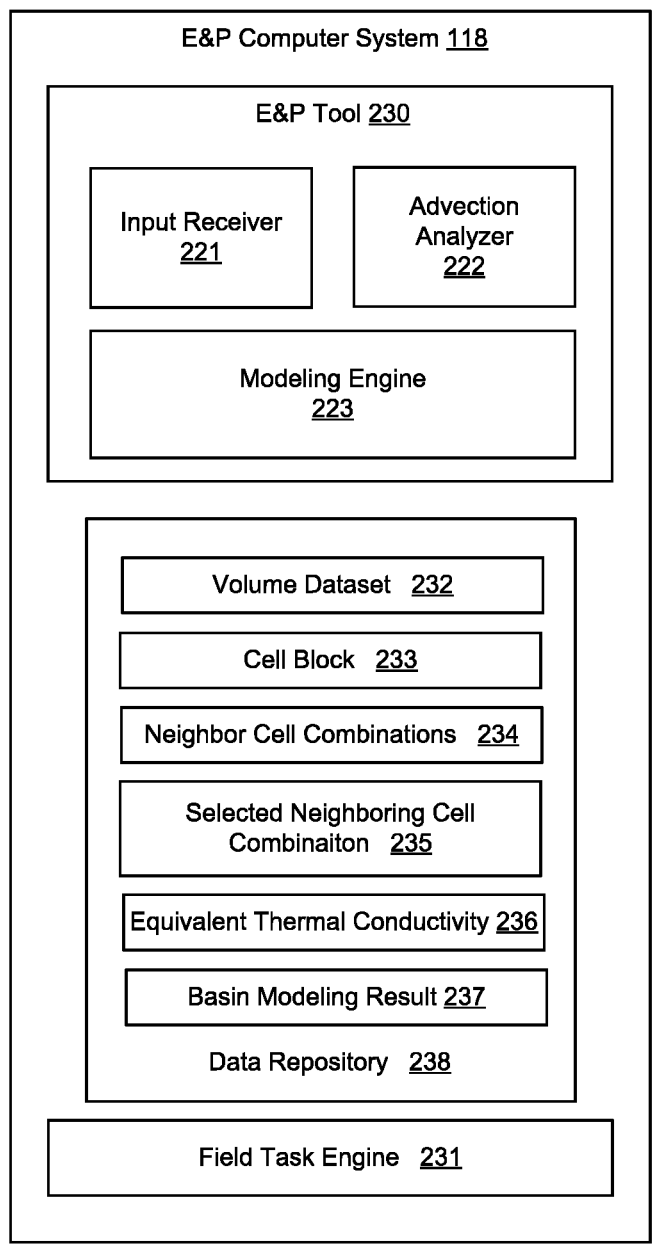
FIG. 1.2

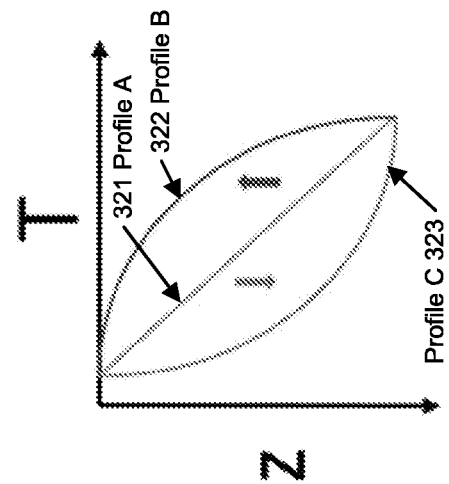
*FIG. 3.2*
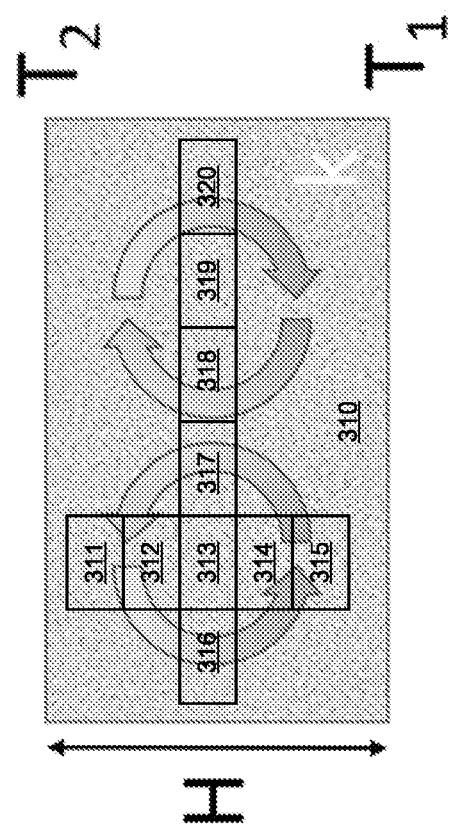
*FIG. 3.1*

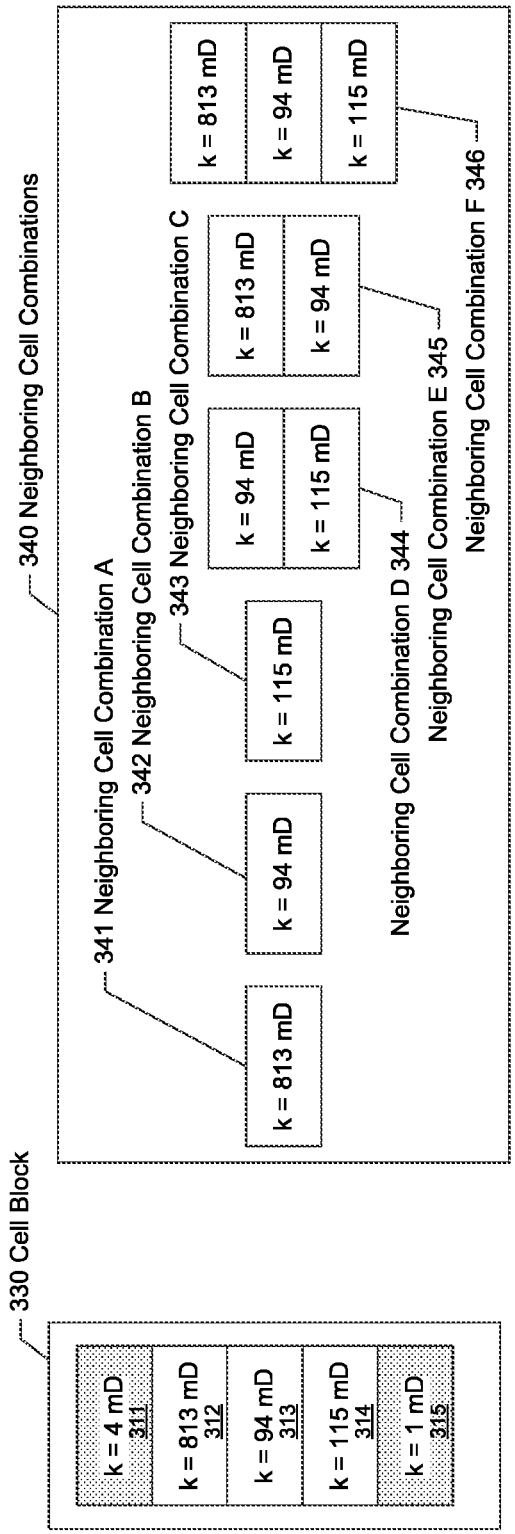

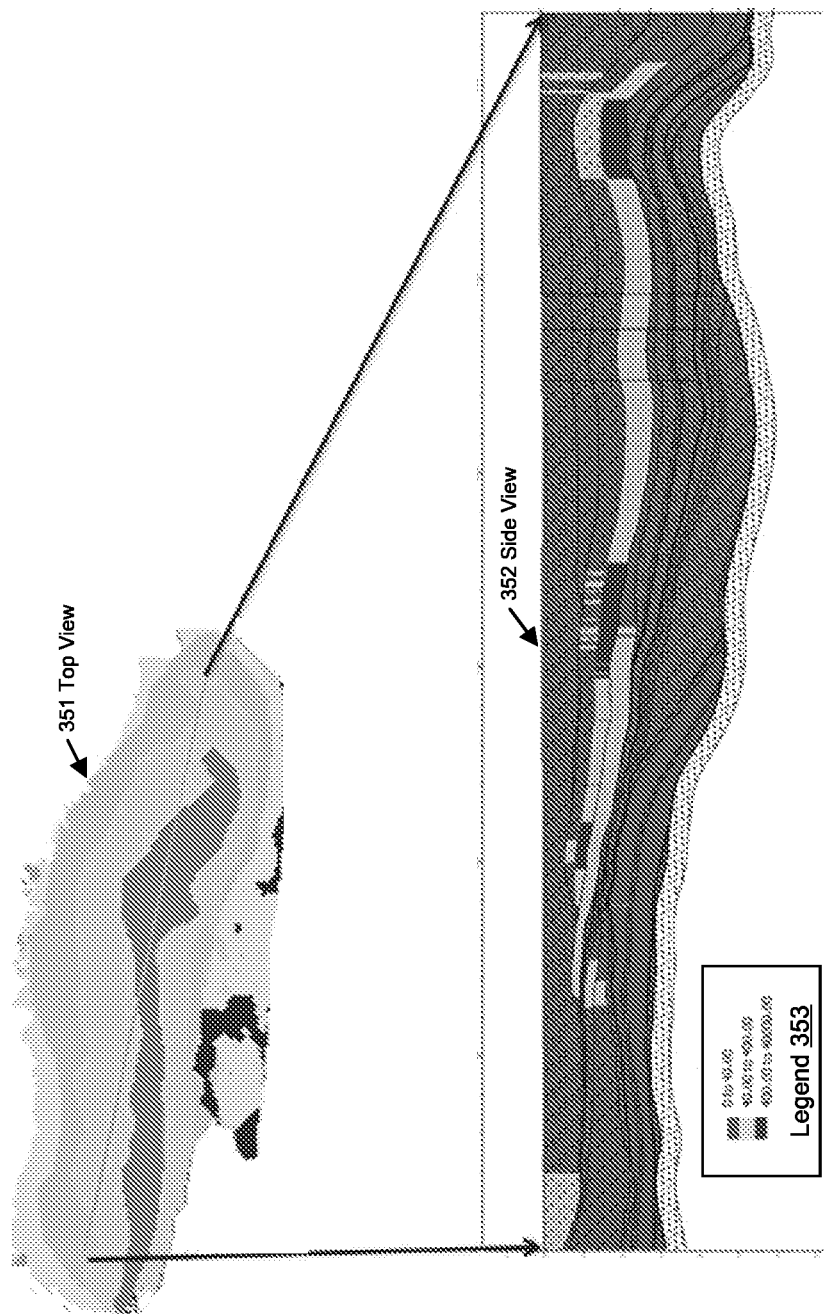
FIG. 3.5

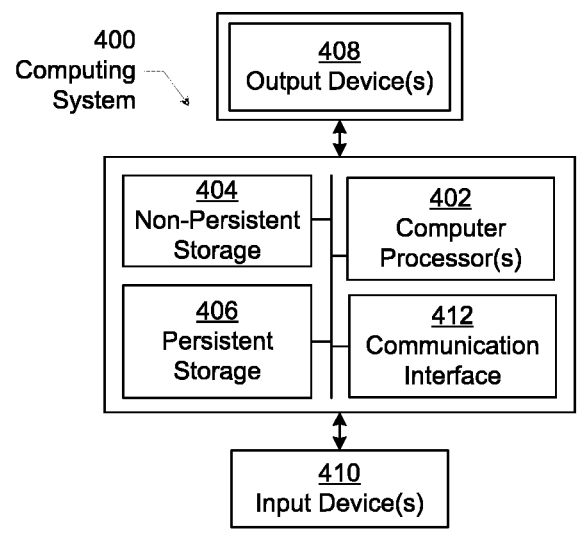
FIG. 4.1
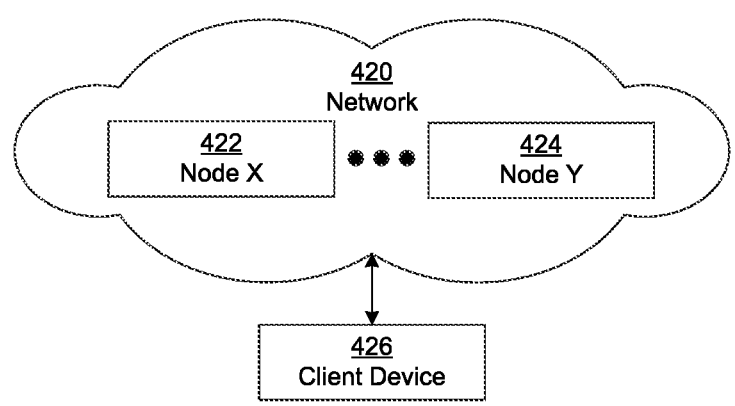
FIG. 4.2

IMPLEMENTING FREE ADVECTION IN BASIN MODELING

BACKGROUND

Temperature evolution of a sedimentary basin affects maturity of the subterranean formations that generate oil and gas and alter the properties of oil and gas in subterranean accumulations. In basin modeling, temperature is calculated by balancing the heat budget of the basin. The heat may be transported across the basin by conduction through the rock bodies or by advection of the fluids contained in the rock pores. As a result, advective heat transport, due to free advection, may have an impact on the results of basin modeling and petroleum systems modeling, in particular for thick permeable layers as part of the modeled system.

Rayleigh number (Ra) for a fluid is a dimensionless number associated with buoyancy-driven flow, also known as free advection or natural advection. When the Rayleigh number is below a defined value for that fluid, heat transfer is primarily in the form of conduction; when it exceeds the defined value, heat transfer is primarily in the form of advection.

SUMMARY

In general, in one aspect, implementing free advection in basin modeling includes a method for performing a field operation of a field. The method includes obtaining, for each of multiple cells in a data volume, a permeability measure to represent fluid passing ability in a corresponding location in the field, generating neighboring cell combinations based on each the multiple neighboring cell combinations including a connected portion, and the permeability measure for each cell of the cells in the connected portion satisfying a pre-determined threshold. The method further includes selecting, from the neighboring cell combinations and based at least on the permeability measure, a selected neighboring cell combination having an optimal combined free advection measure, wherein the selected neighboring cell combination corresponds to an advection candidate region of the field. The method further includes generating an equivalent thermal conductivity for the advection candidate region, and performing, based at least on the equivalent thermal conductivity, a basin modeling of the field to generate a modeling result.

Other aspects will be apparent from the following description and the appended claims.

BRIEF DESCRIPTION OF DRAWINGS

The appended drawings illustrate several embodiments of free advection in basin modeling and are not to be considered limiting of its scope, for free advection in basin modeling may admit to other equally effective embodiments.

FIG. 1.1 is a schematic view, partially in cross-section, of a field in which one or more embodiments may be implemented.

FIG. 1.2 shows a schematic diagram of a system in accordance with one or more embodiments.

FIGS. 3.1, 3.2, 3.3, 3.4, and 3.5 show an example in accordance with one or more embodiments.

FIGS. 4.1 and 4.2 show systems in accordance with one or more embodiments.

DETAILED DESCRIPTION

Figure 2:
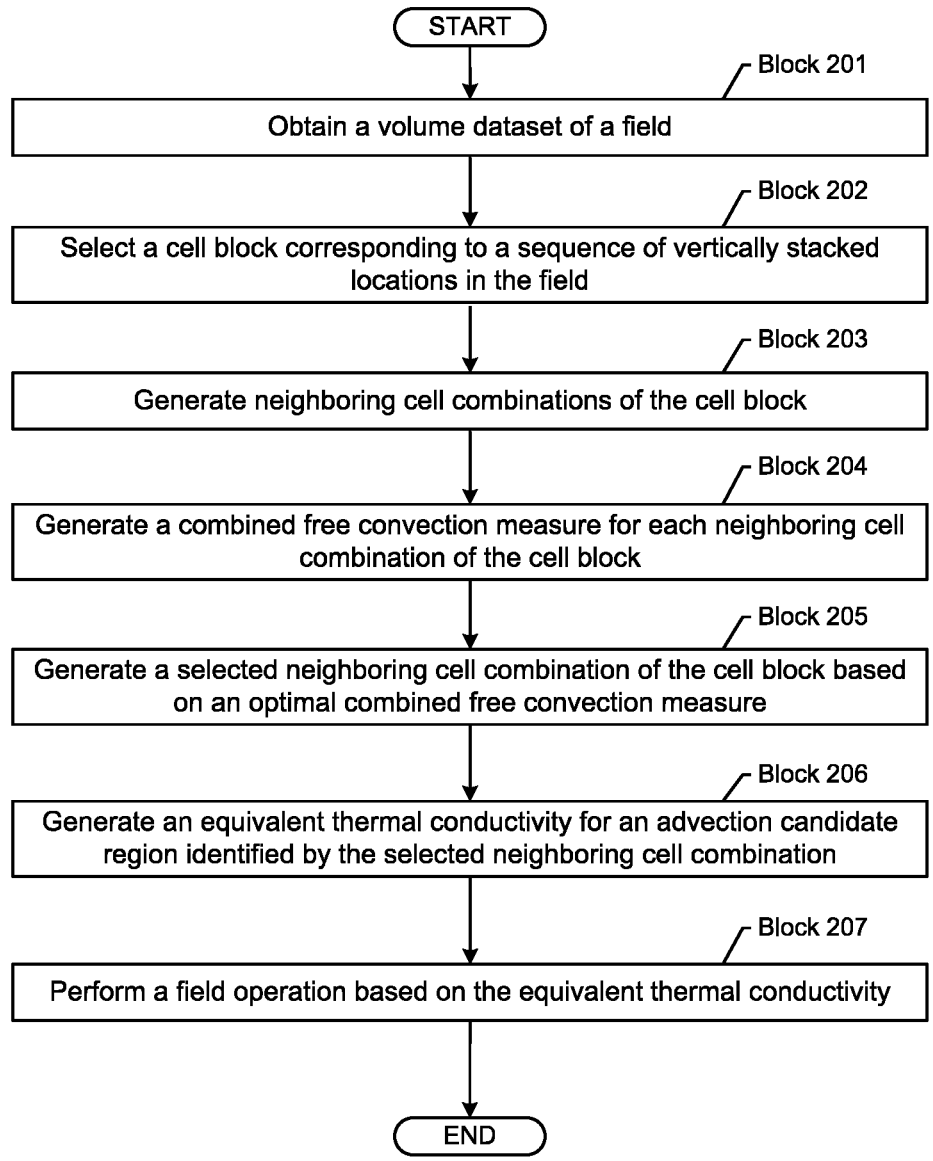
FIG. 2 shows a flowchart in accordance with one or more embodiments.

Specific embodiments will now be described in detail with reference to the accompanying figures. Like elements in the various figures are denoted by like reference numerals for consistency.

In the following detailed description of embodiments, numerous specific details are set forth in order to provide a more thorough understanding. However, it will be apparent to one of ordinary skill in the art that one or more embodiments may be practiced without these specific details. In other instances, well-known features have not been described in detail to avoid unnecessarily complicating the description.

In general, embodiments provide a method and system for performing a field operation by at least including free advection in basin modeling. In one or more embodiments, a permeability measure is obtained for each cell in a data volume to represent an amount of fluid passing ability in a corresponding location in the field. In the data volume, neighboring cell combinations are generated that include a connected portion of cells in the data volume. In particular, the permeability measure for each cell in the connected portion satisfies a pre-determined threshold. From the neighboring cell combinations and based on the permeability measure, a selected neighboring cell combination having an optimal combined free advection measure is then selected. Specifically, the selected neighboring cell combination corresponds to an advection candidate region of the field. In the basin modeling, a conduction equivalent thermal conductivity (named equivalent conductivity) is generated for the advection candidate region. The equivalent thermal conductivity is calculated to produce the same heat flow measure over the advection candidate region when used in a conduction formulation as the heat flow that would result from the modeling of conduction and free advection over the same region. Accordingly, a basin modeling of the field is performed based at least on the equivalent thermal conductivity to generate a modeling result. By including the free advection in basin modeling, a free advective heat transport may be represented as a pseudo-conductive heat transport corresponding to an increased equivalent thermal conductivity. For example, embodiments of free advection in basin modeling may be applied to modeling of temperature-dependent characteristics of the basin, such as the source rock maturity.

FIG. 1.1 depicts a schematic view, partially in cross section, of a field (100) in which one or more embodiments of free advection in basin modeling may be implemented. In one or more embodiments, one or more of the modules and elements shown in FIG. 1.1 may be omitted, repeated, and/or substituted. Accordingly, embodiments of free advection in basin modeling should not be considered limited to the specific arrangement of modules shown in FIG. 1.1.

As shown in FIG. 1.1, the field (100) includes the subterranean formation (104), data acquisition tools (102-1), (102-2), (102-3), and (102-4), wellsite system A (114-1), wellsite system B (114-2), wellsite system C (114-3), a surface unit (112), and an exploration and production (E&P) computer system (118). The subterranean formation (104) includes several geological structures, such as a sandstone layer (106-1), a limestone layer (106-2), a shale layer (106-3), a sand layer (106-4), and a fault line (107). A portion of the subterranean formation (104) may be a geologic basin, such as a sedimentary basin. In particular, the geologic basin includes rock formations and at least one reservoir containing fluids. In one or more embodiments, the rock formations include at least one source rock, and the shale layer (106-3) includes an active kerogen.

By way of further discussion of the geologic basin and basin modeling techniques, the geologic sedimentary basin is a depression in the surface of the Earth's crust that undergoes infilling with sediment deposits. Such sediments are derived from weathered rock formations, from biogenic activity, from precipitation of minerals from solution, and from combinations of the foregoing. When deposited sediments are buried, the sedimentary deposits are subjected to increasing pressure and temperature. Such burial and subjecting to elevated pressure and temperature begin the process of lithification, which is conversion of unconsolidated sediments into rock formations.

Petroleum (i.e., oil and gas) may be formed within a basin by chemical reactions of sedimentary biogenic precursor material. After generation, petroleum migrates within the basin via permeable pathways until the petroleum accumulates within porous and permeable reservoir rock formations, or until the petroleum is dissipated by chemical or biochemical reactions or leakage to the surface of the basin. Within any particular basin, one or more "plays" for possible production of hydrocarbons may exist. The United States Geological Survey defines a "play" as "a set of discovered or undiscovered oil and gas accumulations or prospects that exhibit nearly identical geological characteristics such as trapping style, type of reservoir and nature of the seal." A reservoir may include several different plays which differ from each other by the nature of the fluids within the pore spaces of the rock formations and/or the pressure thereof. A "reservoir" is a rock formation with substantially uniform rock mineral properties and spatial distribution of permeability such that the rock formation has the capability to store fluids, and the capability for fluids to be moved therethrough by application of suitable pressure variations.

Returning to the discussion of FIG. 1.1, in one or more embodiments, data acquisition tools (102-1), (102-2), (102-3), and (102-4) are positioned at various locations along the field (100) for collecting data of the subterranean formation (104), referred to as survey operations. In particular, the data acquisition tools are adapted to measure the subterranean formation (104) and detect the characteristics of the geological structures of the subterranean formation (104). For example, data plots (108-1), (108-2), (108-3), and (108-4) are depicted along the field (100) to demonstrate the data generated by the data acquisition tools. Specifically, the static data plot (108-1) is a seismic two-way response time. Static data plot (108-2) is core sample data measured from a core sample of the subterranean formation (104). Static data plot (108-3) is a logging trace, referred to as a well log. Production decline curve or graph (108-4) is a dynamic data plot of the fluid flow rate over time. Other data may also be collected, such as historical data, analyst user inputs, economic information, and/or other measurement data and other parameters of interest.

Further as shown in FIG. 1.1, each of the wellsite system A (114-1), wellsite system B (114-2), and wellsite system C (114-3) is associated with a rig, a wellbore, and/or other wellsite equipment configured to perform wellbore operations, such as logging, drilling, fracturing, production, or other applicable operations. For example, the wellsite system A (114-1) is associated with a rig (101), a wellbore (103), and drilling equipment to perform a drilling operation. Similarly, the wellsite system B (114-2) and wellsite system C (114-3) are associated with respective rigs, wellbores, and/or other wellsite equipments, such as production equipment and logging equipment to perform production operations and logging operations, respectively. Generally, survey operations and wellbore operations are referred to as field operations of the field (100). In addition, data acquisition tools and wellsite equipments are referred to as field operation equipments. The field operations are performed as directed by a surface unit (112). For example, the field operation equipment may be controlled by a field operation control signal that is sent from the surface unit (112).

In one or more embodiments, the surface unit (112) is operatively coupled to the data acquisition tools (102-1), (102-2), (102-3), (102-4), and/or the wellsite systems. In particular, the surface unit (112) is configured to send commands to the data acquisition tools (102-1), (102-2), (102-3), (102-4), and/or the wellsite systems and to receive data therefrom. In one or more embodiments, the surface unit (112) may be located at the wellsite system A (114-1), wellsite system B (114-2), wellsite system C (114-3), and/or remote locations. The surface unit (112) may be provided with computer facilities (e.g., an E&P computer system (118)) for receiving, storing, processing, and/or analyzing data from the data acquisition tools (102-1), (102-2), (102-3), (102-4), the wellsite system A (114-1), wellsite system B (114-2), wellsite system C (114-3), and/or other parts of the field (100). The surface unit (112) may also be provided with or have functionally for actuating mechanisms at the field (100). The surface unit (112) may then send command signals to the field (100) in response to data received, stored, processed, and/or analyzed, for example, to control and/or optimize various field operations described above.

In one or more embodiments, the surface unit (112) is communicatively coupled to the E&P computer system (118). In one or more embodiments, the data received by the surface unit (112) may be sent to the E&P computer system (118) for further analysis. Generally, the E&P computer system (118) is configured to analyze, model, control, optimize, or perform management tasks of the aforementioned field operations based on the data provided from the surface unit (112). In one or more embodiments, the E&P computer system (118) is provided with functionality for manipulating and analyzing the data, such as performing simulation, planning, and optimization of production operations of the wellsite system A (114-1), wellsite system B (114-2), and/or wellsite system C (114-3). In one or more embodiments, the result generated by the E&P computer system (118) may be displayed for an analyst user to view the result in a two dimensional (2D) display, three dimensional (3D) display, or other suitable displays. Although the surface unit (112) is shown as separate from the E&P computer system (118) in FIG. 1.1, in other examples, the surface unit (112) and the E&P computer system (118) may also be combined.

Although FIG. 1.1 shows a field (100) on the land, the field (100) may be an offshore field. In such a scenario, the subterranean formation may be in the sea floor. Further, field data may be gathered from the field (100) that is an offshore field using a variety of offshore techniques for gathering field data.

FIG. 1.2 shows more details of the E&P computer system (118) in which one or more embodiments of free advection in basin modeling may be implemented. In one or more embodiments, one or more of the modules and elements shown in FIG. 1.2 may be omitted, repeated, and/or substituted. Accordingly, embodiments of free advection in basin modeling should not be considered limited to the specific arrangements of modules shown in FIG. 1.2.

As shown in FIG. 1.2, the E&P computer system (118) includes an E&P tool (230), a data repository (238) for storing input data, intermediate data, and resultant outputs of the E&P tool (230), and a field task engine (231) for performing various tasks of the field operation. In one or more embodiments, the data repository (238) may include one or more disk drive storage devices, one or more semiconductor storage devices, other suitable computer data storage devices, or combinations thereof. In one or more embodiments, content stored in the data repository (238) may be stored as a data file, a linked list, a data sequence, a database, a graphical representation, any other suitable data structure, or combinations thereof.

In one or more embodiments, the content stored in the data repository (238) includes the volume dataset (232), cell block (233), neighboring cell combinations (234), selected neighboring cell combination (235), equivalent thermal conductivity (236), and basin modeling result (237). In one or more embodiments, the volume dataset (232) includes a collection of data items assigned to a set of cells in a data volume. The data volume is a geometric volume (e.g., one-dimensional volume, two-dimensional volume, three-dimensional volume, etc.) that is associated with data items. In one or more embodiments, the data volume represents a portion (e.g., a basin or a portion of the basin) of the subterranean formation (104) depicted in FIG. 1.1 above. In particular, the data volume is divided into a large number (e.g., thousands, hundreds of thousands, millions, etc.) of cells corresponding to locations in the portion of the subterranean formation (104). For example, the topology of a basin or a portion of the basin may be represented by geometrical parameters (e.g., dimensions and shapes) of the data volume.

Two or more cells sharing at least a portion of a boundary in the data volume are collectively referred to as a cell block. In other words, a cell block is a connected portion of cells in the data volume. The data volume of the volume dataset (232) includes multiple cell blocks, such as the cell block (233). A neighboring cell combination is a strict subset of neighboring cells in a cell block (e.g., cell block (233)) where each cell in the neighboring cell combination satisfies a pre-determined criterion. In one or more embodiments, the pre-determined criterion specifies a threshold value of a permeability measure. For example, each cell in the neighboring cell combination is associated with a permeability measure exceeding the threshold value. A cell block (e.g., cell block (233)) may include multiple neighboring cell combinations. For example, in FIG. 1.2, neighboring cell combinations of the cell block (233) are stored in the data repository (238) as the neighboring cell combinations (234). For example, the cell block (233) may represent a local high permeability area in a basin. Each of the neighboring cell combinations (234) may correspond to a connected portion of the local high permeability area. An example of a cell block and associated neighboring cell combinations is described in reference to FIG. 3.3 below.

Further, a cell in the data volume is assigned data items to describe characteristics associated with a corresponding location in the basin. For example, the volume dataset (232) may include a gamma ray log, a sonic log, a bulk density log, and/or other types of logging results generated by a data acquisition tool, such as the data acquisition tool (102-3) depicted in FIG. 1.1 above. In other words, a cell in the data volume may be assigned a gamma ray measurement, a sonic measurement, a bulk density measurement, and/or other types of logging measurement associated with a corresponding location in the basin. In another example, the volume dataset (232) may include data items that are derived from the field measurements, such as intermediate or final results of analyzing various logging results. In one or more embodiments, the data items include a permeability measure and a thermal conductivity associated with a corresponding location in the basin that is modeled by the data volume.

Throughout this disclosure, advection refers to heat transfer due to a bulk motion of a heat retaining fluid in a medium, such as one or more geological layers. Such heat transfer is referred to as an advective heat transfer or an advective heat flow. Free advection refers to the advection where the bulk motion of the fluid is induced by temperature differences and not induced by a topology of the geological layers. In other words, the free advection is independent of the topology.

In one or more embodiments, the selected neighboring cell combination (e.g., selected neighboring cell combination (235)) is a neighboring cell combination selected as a result of analyzing data items in the volume dataset (232). In one or more embodiments, the selected neighboring cell combination (235) is selected from neighboring cell combinations of a cell block. In one or more embodiments, the selected neighboring cell combination is selected based on an optimal combined free advection measure described below. In particular, a combined free advection measure represents an amount of free advection in a field location corresponding to a neighboring cell combination. The optimal combined free advection measure may be the combined free advection measure having a highest convective potential. For example, the optimal combined free advection measure may include an optimal effective Rayleigh number described in reference to FIG. 3.3 below. The selected neighboring cell combination (235) may be selected from the neighboring cell combinations (234) of the cell block (233) based on the optimal effective Rayleigh number. In one or more embodiments, the optimal effective Rayleigh number is the effective Rayleigh number that has the highest value. Other criteria for defining an optimal combined free advection measure may be used without departing from the scope of one or more embodiments.

In one or more embodiments, the equivalent thermal conductivity (236) is a convolution of an actual thermal conductivity and a pseudo-thermal conductivity. In particular, the actual thermal conductivity represents a physical thermal conduction characteristic of a location in the basin. In contrast, the pseudo-thermal conductivity is a parameter calculated during basin modeling. In one or more embodiments, the equivalent conductivity is used to model an advective heat flow in conjunction with a conductive heat flow over the same region. While the advective heat flow does not correspond to any physical heat conduction, the magnitude of the advective heat flow is equivalent to a magnitude of a modeled heat conduction based on the pseudo-thermal conductivity. An example of the equivalent thermal conductivity (236) is described in reference to FIG. 3.5 below.

In one or more embodiments, the E&P tool (230) includes the input receiver (221), the advection analyzer (222), and the modeling engine (223). Each of these components of the E&P tool (230) is described below.

In one or more embodiments, the input receiver (221) is configured to obtain a volume dataset (e.g., volume dataset (232)) for analysis by the advection analyzer (222) and the modeling engine (223). In one or more embodiments, the input receiver (221) obtains the volume dataset (232), at least in part, from the surface unit (112) depicted in FIG. 1.1 above. For example, the input receiver (221) may obtain one or more portions of volume datasets from the surface unit (112) intermittently, periodically, in response to a user activation, or as triggered by an event. Accordingly, the intermediate and final results of the advection analyzer (222) and the modeling engine (223) may be generated intermittently, periodically, in response to a user activation, or as triggered by an event.

In one or more embodiments, the advection analyzer (222) is configured to generate a combined free advection measure that represents an amount of free advection in a field location corresponding to a cell block. Based on the combined free advection measure, the advection analyzer (222) is further configured to identify an advection candidate region of the field that corresponds to a selected neighboring cell combination having an optimal combined free advection measure. In one or more embodiments, the optimal combined free advection measure is a highest combined free advection measure among neighboring cell combinations in a cell block. Finally, the advection analyzer (222) is configured to generate an equivalent thermal conductivity for the advection candidate region that takes into account advective heat transfer in the field. In one or more embodiments, the advection analyzer (222) generates the equivalent thermal conductivity for the advection candidate region using the method described in reference to FIG. 2 below. An example of generating the optimal combined free advection measure and the equivalent thermal conductivity for the advection candidate region is described in reference to FIGS. 3.3-3.5 below.

In one or more embodiments, the modeling engine (223) is configured to generate a basin model of a field by performing basin simulations. Basin modeling is a technique for modeling geological processes that may have occurred in sedimentary basins over geological times. For example, basin modeling may be an output of simulations of the deposition and erosion of sediments through geologic time, calculating the temperature, pressure and rock stress distribution, or any combination thereof as well as other possible output. Input parameters to the basin modeling include burial history, paleo-water-depth maps, SWITs (sediment water interface temperatures), heat flow maps, and several rock attributes (e.g., thermal conductivities, permeabilities, rock densities, radiogenic sources). During the basin modeling, temperatures and pressures are determined by solving a differential equation, e.g., by using a finite element solver. In one or more embodiments, basin modeling may be used without considering any hydrocarbon fluids or reservoir. In one or more embodiments, basin modeling may be focused on, or otherwise include, considerations of hydrocarbon fluids or reservoir(s) in the basin. In such embodiments, the basin modeling is also referred to as petroleum system modeling. For example, an overpressure prediction may be performed with basin modeling to reveal basin-wide water flow connectivities, porosity distributions correlating with potential hydrocarbon storage capacity and sealing strengths of potential hydrocarbon storage containers. Further, basin modeling may also be used for evaluation of basin-wide temperature distributions, which is the main controlling parameter determining the velocity of chemical reactions for generation of hydrocarbons within source rocks. Accordingly, the maturity defining the hydrocarbon bearing potential of source rocks may be modeled. As used herein, rocks with high total organic carbon are referred to as source rocks and the maturity of a rock is a measure of its state in terms of hydrocarbon generation. In particular, the source rock alters under temperature such that the organic molecules slowly mature into hydrocarbons. Source rocks are therefore broadly categorized as immature (i.e., no hydrocarbon generation), sub-mature (i.e., limited hydrocarbon generation), mature (i.e., extensive generation) and overmature (i.e., most hydrocarbons have been generated). The maturity of a source rock may be used as an indicator of the hydrocarbon potential of the source rock. For example, a sub-mature source rock has a higher potential to generate further hydrocarbons than an overmature source rock.

In one or more embodiments, the basin is modeled or otherwise represented as a data volume where a cell in the data volume is assigned data items to describe characteristics associated with a corresponding location in the basin. As noted above, part of the data items may correspond to measurements obtained from the field, while other parts of the data items may correspond to intermediate or final results of the basin modeling that are derived, at least in part, from these measurements. The data volume and the assigned data items collectively form a basin model. In other words, the basin model includes the data volume and the assigned data items. Specifically, the assigned data items in the data volume correspond to a volume dataset of the basin model. In one or more embodiments, basin modeling uses the basin model to simulate the events leading to generation, migration and accumulation of hydrocarbons in source rocks of the reservoir(s) in the basin. In this context, the basin model is also referred to as a petroleum system model. Further, the basin model or petroleum system model may correspond to the entire basin or a portion of the basin.

In one or more embodiments, the data items in the basin model may describe the "charge potential" (e.g., source rock fractional hydrocarbon precursor content, source rock thickness, and hydrocarbon properties), the "trap" (e.g., the reservoir geometry, reservoir and seal qualities) of a play, and the thermal, pressure and hydrocarbon generation and migration history. Such data items are used in the basin modeling to make predictions of current hydrocarbon quality and spatial distribution within the basin. In one or more embodiments, the data items in the basin model may also describe petroleum fluids' characteristics (e.g., pressure, volume, and temperature (PVT), composition, etc.) that are determined in the basin modeling by simulating the processes of generation and expulsion. In particular, the processes of generation and expulsion govern the overall composition of the fluids and the PVT behavior responsible for the distribution of components in each fluid phase during secondary migration and accumulation in a reservoir. During basin modeling, the charge history of an accumulation or an individual reservoir may be tracked in compositional form according to selected compound classes, for example, $CO_2$, $H_2S$, methane, $C_{2-5}$, $C_{6-15}$, $C_{16+}$. Thermodynamic models known as equations of state, e.g., SRK (Soave-Redlich-Kwong) and PR (Peng-Robinson), may also be used to make phase property predictions such as gas-oil ratio (GOR), fluid density and/or fluid viscosity. Post-accumulation alteration processes such as biodegradation, water washing, and oil-to-gas cracking may also be simulated. Source rock tracking, the evolution of the composition through time, yields and compositions of the products generated and released may also be modeled.

The petroleum systems modeling or basin modeling is not limited to modeling only a single field. The spatial and temporal extent covered by basin models is larger than for reservoir simulation models. Basin models may cover one or more sedimentary basins and up to 1000 or more fields, often from about 100 kilometers (km) in lateral extension and 10 km in depth up to 2000 km in lateral size. The temporal extent of the basin models may cover relevant geological events and may go back in geological time more than 100 million years. Reservoir models generally cover lateral sizes a few kilometers or less and are restricted to selected reservoir formations in depth, such as hundreds of meters. Reservoir simulation timescales refer to petroleum production timescales and may range from days to decades. Therefore, the spatial and temporal resolution of basin models is lower than that required for reservoir simulation. Some post-migration processes that affect the quality of the hydrocarbon, such as biodegradation and water washing known to occur on timescales beyond reservoir simulation capabilities, may be better modeled at the basin scale.

As described above, the basin modeling result (237) includes, at least in part, basin-wide temperature distributions, velocity of chemical reactions for generation of hydrocarbons within source rocks, and predictions of current hydrocarbon quality and spatial distribution within the basin. In one or more embodiments, the basin modeling result (237) is used by the field task engine (231) to facilitate performing a field operation.

In one or more embodiments, the E&P computer system (118) includes the field task engine (231) that is configured to generate a field operation control signal based at least on a result generated by the E&P tool (230), such as based on the equivalent thermal conductivity (236) or the basin modeling result (237). As noted above, the field operation equipment depicted in FIG. 1.1 above may be controlled by the field operation control signal. For example, the field operation control signal may be used to control drilling equipment, an actuator, a fluid valve, or other electrical and/or mechanical devices disposed about the field (100) depicted in FIG. 1.1 above. In particular, the field planning operation, equivalent thermal conductivity (236) generated by the advection analyzer (222) and/or the basin modeling result (237) generated by the modeling engine (223).

The E&P computer system (118) may include one or more system computers, such as shown in FIGS. 4.1 and 4.2 below, which may be implemented as a server or any conventional computing system. However, those skilled in the art, having benefit of this disclosure, will appreciate that implementations of various technologies described herein may be practiced in other computer system configurations, including hypertext transfer protocol (HTTP) servers, handheld devices, smartphones, tablet computers, multiprocessor systems, microprocessor-based or programmable consumer electronics, network personal computers, minicomputers, mainframe computers, and the like.

While specific components are depicted and/or described for use in the units and/or modules of the E&P computer system (118) and the E&P tool (230), a variety of components with various functions may be used to provide the formatting, processing, utility and coordination functions for the E&P computer system (118) and the E&P tool (230). The components may have combined functionalities and may be implemented as software, hardware, firmware, or combinations thereof.

FIG. 2 depicts an example method in accordance with one or more embodiments. For example, the method depicted in FIG. 2 may be practiced using the E&P computer system (118) described in reference to FIGS. 1.1 and 1.2 above. In one or more embodiments, one or more of the elements shown in FIG. 2 may be omitted, repeated, and/or performed in a different order. Accordingly, embodiments of free advection in basin modeling should not be considered limited to the specific arrangements of elements shown in FIG. 2.

In Block 201, a volume dataset of a field is obtained. In one or more embodiments, the volume dataset includes, for each cell in a data volume corresponding to a basin of the field, data items representing at least a permeability measure and a thermal conductivity of the field.

In Block 202, a cell block is selected from the data volume based on a pre-determined criterion. In one or more embodiments, neighboring cells corresponding to vertically stacked locations in the field are selected from the data volume as the cell block. In particular, the pre-determined criterion specifies that the permeability measure for each of the neighboring cells exceeds a pre-determined threshold. In other words, the cell block is selected from the data volume to represent a sequence of vertically stacked high permeability locations in the field.

In Block 203, a consecutive portion of the neighboring cells in the cell block is selected as a neighboring cell combination. In one or more embodiments, multiple neighboring cell combinations having various cell counts are selected from the cell block. Based on Blocks 202 and 203, a set of neighboring cell combinations are generated for the cell block where the permeability measure for each cell in each neighboring cell combination satisfies a pre-determined threshold. In one or more embodiments, the permeability measure for each cell in each neighboring cell combination exceeds a pre-determined permeability value. In one or more embodiments, each neighboring cell combination corresponds to a connected portion of a local high permeability area in a basin.

In Block 204, based on the permeability measure for each of the neighboring cells in a neighboring cell combination, a combined free advection measure is generated for the neighboring cell combination. In one or more embodiments, the combined free advection measure is generated for each neighboring cell combination of the cell block. In one or more embodiments, the combined free advection measure is generated to represent an amount of free advection in a connected portion of a local high permeability area, such as the aforementioned sequence of vertically stacked high permeability locations. In one or more embodiments, the combined free advection measure is proportional to a thickness and an effective permeability of a connected portion of the aforementioned sequence of vertically stacked high permeability locations.

In Block 205, a neighboring cell combination having an optimal combined free advection measure is selected from the neighboring cell combinations of the cell block. In one or more embodiments, the selected neighboring cell combination has the highest combined free advection measure in the cell block. In other words, the optimal combined free advection measure is higher than any other combined free advection measure for the set of neighboring cell combinations. In one or more embodiments, a local region in the field that corresponds to the selected neighboring cell combination is identified as an advection candidate region.

In Block 206, an equivalent thermal conductivity is generated for the advection candidate region. In one or more embodiments, the equivalent thermal conductivity is generated by multiplying a multiplier factor and an effective thermal conductivity associated with the selected neighboring cell combination. In one or more embodiments, the thermal conductivities of the cells in the selected neighboring cell combination are combined to generate the effective thermal conductivity based on a pre-determined formula, such as a harmonic mean formula. In one or more embodiments, a ratio between the optimal combined free advection measure and a pre-determined free advection measure baseline is computed as the multiplier factor. For example, the optimal combined free advection measure is a dimensionless optimal effective Rayleigh number. The pre-determined free advection measure baseline is a critical Rayleigh number. The optimal combined free advection measure and the pre-determined free advection measure baseline are described in reference to FIG. 3.5 below.

In Block 207, a field operation is performed based at least on the equivalent thermal conductivity. In one or more embodiments, a basin modeling of the field is performed to generate a modeling result based at least on the equivalent thermal conductivity. For example, a field development plan may be defined based on the equivalent thermal conductivity or the resultant modeling result. The field development plan may include locations where exploration wells and/or production wells are to be drilled. Accordingly, drilling operations and subsequent production operations may be performed to extract hydrocarbons according to the field development plan.

In another example, operating parameters of a drilling operation and/or production operation may be determined and/or adjusted based on the modeling result. Accordingly, a field operation control signal is generated based on the operating parameters and is sent from a surface unit to the field operation equipment for the drilling operation and/or production operation.

FIGS. 3.1, 3.2, 3.3, 3.4, and 3.5 show an example in accordance with one or more embodiments. In one or more embodiments, the example shown in these figures may be practiced using the E&P computer system shown in FIGS. 1.1 and 1.2 and the method described in reference to FIG. 2 above. The following example is for example purposes and not intended to limit the scope of the claims.

FIG. 3.1 shows a schematic diagram of an example petroleum system model (310) of a geological layer with thickness H and having a top boundary with temperature $T_2$ and a bottom boundary with temperature $T_1$. The temperature difference between $T_2$ and $T_1$ results in a temperature gradient across the petroleum system model (310). Circular arrows within the petroleum system model (310) represent fluid (e.g., brine) movements that produce an advective heat flow. The direction of the advective heat flow may vary depending on the direction of the net fluid movement across the petroleum system model (310). The petroleum system model (310) is divided into a collection of cells. For example, cells (311) through (315) may represent a vertical column section of the basin while cells (316) through (320) and the cell (313) may represent a horizontal layer section of the basin. Although a small number of cells along vertical and horizontal gridlines arranged in a two-dimensional manner are shown in FIG. 3.1, the petroleum system model (310) may include hundreds, thousands, millions of cells arranged along curves, lines, or other grid systems in a data volume.

As noted above, basin modeling and petroleum systems modeling are used to assess generation, migration and biodegrading of oil and gas that depend on subsurface temperature and are controlled by the subsurface heat flow conditions. In particular, the basin modeling and petroleum systems modeling are used to predict locations and volume of petroleum accumulations depending on rock properties and pressure and temperature, among other factors. For small permeabilities (e.g., less than 1 millidarcys (mD)) and small layer thicknesses (e.g., less than 10 meters (m)) where no advection cells appear, a conductive part $q_{cond}$ of the heat flow is modeled in Eq. (1) as a product of thermal conductivity and temperature gradient $\nabla T$. $\lambda$ in Eq. (1) is for homogeneous medium. While thermal conductivity may be a tensor, a scalar value is used for simplicity in Eq. (1) below.

$$q_{cond} = -\lambda \nabla T \qquad \text{Eq. (1)}$$

Where permeabilities and layer thicknesses exceed a certain value (e.g., 1 millidarcy (mD) and 10 meters (m)), advection cells may form with changing fluid (e.g., brine) density and temperature (hence, with depth). To consider the effects of the advection cells, an additional advective part $q_{adv}$ of the heat flow is modeled in Eq. (2) as a product of volumetric heat capacity of the fluid $(\rho c)_f$ (measured in units of joules per cubic meter per Kelvin or J/m³/K), Darcy velocity v, and temperature T.

$$q_{adv} = (\rho c)_f v T \qquad \text{Eq. (2)}$$

FIG. 3.2 shows temperature T as a function of depth Z in the petroleum system model (310). Specifically, the temperature T is one of the data items in the petroleum system model (310). For example, the cells (316) through (320) and the cell (313) may have the same depth and be assigned the same value of temperature T. In contrast, each of the cells (311) through (315) may be assigned temperature values according to one of the profiles shown in FIG. 3.2. In particular, the profile A (321) corresponds to the conductive part $q_{cond}$ of the heat flow, the profile B (322) corresponds to the conductive part $q_{cond}$ and advective part $q_{adv}$ of the heat flow with upward fluid movement, and the profile C (323) corresponds to the conductive part $q_{cond}$ and advective part $q_{adv}$ of the heat flow with downward fluid movement. The difference between the profile A (321) and profile B (322) may substantially change the results of basin modeling, such as the simulated or modeled source rock maturity.

As described in reference to FIG. 1.1 and FIG. 2 above, the advective part of heat flow may be modeled by a pseudo-conductive contribution by increased equivalent thermal conductivity. In particular, the free advection is modeled in this manner while forced advection (e.g., driven by topography) is not included.

As an example, the petroleum system model (310) may represent a porous medium made of a layer package of permeable geological layers within the basin. A dimensionless Rayleigh number may be used as a measure for the amount of free advection (i.e., free advection measure) in the petroleum system model (310). The Rayleigh number Ra is defined as Eq. (3) below.

$$Ra = \frac{kg\alpha(\rho^2 c)_f H \Delta T}{\eta_f \lambda} \qquad \text{Eq. (3)}$$

In Eq. (3), k is permeability, g is gravity constant, α is volumetric thermal expansion coefficient, ρ is fluid density, c is specific heat of the fluid based on the fluid mass, subscript f refers to the fluid, H is a characteristic length for the heat transport by advection (e.g., the thickness of the layer package), $\Delta T$ is the corresponding temperature difference at top and bottom of the layer package, $\eta_f$ is dynamic viscosity of the fluid, and $\lambda$ is bulk thermal conductivity.

When the layer package within the basin represented by the petroleum system model (310) does not include any single homogenous permeable layer, Eq. (3) may not be used directly to compute the Rayleigh number as the free advection measure. Instead, a stepwise procedure may be used to compute an optimal effective Rayleigh number. In particular, the stepwise procedure may be based on the method described in reference to FIG. 2 above where the optimal effective Rayleigh number corresponds to the optimal free advection measure. FIGS. 3.3 and 3.4 show an example cell block (330) and associated neighboring cell combinations (340) that may be used in the stepwise procedure.

As shown in FIG. 3.3, the cell block (330) includes five cells corresponding to cells (311) through (315) depicted in FIG. 3.1 above. Each of the cells in the cell block (330) is assigned a permeability value, such as 4 mD, 813 mD, 94 mD, 115 mD, and 1 mD. Based on a permeability threshold of 10 mD, the cell (312), cell (313), and cell (314) are selected to form neighboring cell combinations (340).

As shown in FIG. 3.4, the neighboring cell combinations (340) include neighboring cell combination A (341) through neighboring cell combination F (346). For each of these neighboring cell combinations, a total thickness $H_i$ and an effective permeability $k_{i,\mathit{eff}}$ are computed. The total thickness $H_i$ is a sum of the thickness of the cells in the neighboring cell combination. The effective permeability $k_{i,\mathit{eff}}$ may be computed using an appropriate mixing formula, such as the harmonic mean of the permeability values of the cells in the neighboring cell combination. The effective Rayleigh number $Ra_{\mathit{eff}}$ is then computed for each neighboring cell combination using Eq. (3) by substituting k and H with $k_{i,\mathit{eff}}$ and $H_i$. Accordingly, the optimal effective Rayleigh number (i.e., optimal $Ra_{\mathit{eff}}$) is selected from the effective Rayleigh numbers of the neighboring cell combinations (340). For example, the highest (i.e., largest) effective Rayleigh number may be selected as the optimal $Ra_{\mathit{eff}}$.

A critical Rayleigh number $Ra_c$ is defined in Eq. (4) as a criterion for stability within the layer package represented by the petroleum system model (310).

$$Ra_c = 4\pi^2 \approx 40. \qquad \text{Eq. (4)}$$

The locations in the basin that correspond to the neighboring cell combination with the optimal $Ra_{\mathit{eff}}$ exceeding the critical Rayleigh number $Ra_c$ are identified as an advection candidate region. In many parts of a basin, the corresponding optimal $Ra_{\mathit{eff}}$ is less than $Ra_c$. However, a local portion of the basin having permeable reservoir layers may correspond to the optimal $Ra_{\mathit{eff}}$ in the range of 100-1000 or higher. Such a local portion of the basin is identified as the advection candidate region where free advection may occur. In the advection candidate region, purely conductive heat flow is not sufficient to describe total heat transport within the porous medium.

FIG. 3.5 shows the optimal $Ra_{\mathit{eff}}$ in a larger scale petroleum system model than the petroleum system model (310). In particular, FIG. 3.5 shows a top view (351) and a side view (352) of the larger scale petroleum system model. In particular, the top view (351) corresponds to an aerial view of the basin and the side view (352) corresponds to a cross-sectional view of the basin. In this larger scale petroleum system model, hundreds of thousands of cells are not individually shown so as to avoid obscuring the contours of the optimal $Ra_{\mathit{eff}}$. Instead, the optimal $Ra_{\mathit{eff}}$ of each cell is represented as highlighting according to the legend (353). The larger scale petroleum system model includes portions highlighted with the two higher tiers of optimal $Ra_{\mathit{eff}}$ as defined in the legend (353). These portions have the optimal $Ra_{\mathit{eff}}$ exceeding the $Ra_c$ and correspond to advection candidate regions in the basin.

In the advection candidate regions associated with optimal $Ra_{\mathit{eff}}$ exceeding the $Ra_c$, an equivalent thermal conductivity $\lambda_{\mathit{eff}}$ is defined in Eq. (5), Eq. (6), and Eq. (7) below.

$$Nu = \frac{\text{total heat transported within the layer package}}{\text{heat transportet by purely conduction}} \qquad \text{Eq. (5)}$$

$$\lambda_{\mathit{eff}} = Nu\lambda \qquad \text{Eq. (6)}$$

$$Nu = cRa^\beta \qquad \text{Eq. (7)}$$

In Eq. (6), $\lambda$ is the thermal conductivity. In Eq. (7), c is an empirical baseline factor, $\beta$ is an empirical constant, and Ra may be substituted with the optimal $Ra_{\mathit{eff}}$ where applicable. In other words, Ra may be used if Eq. (3) is applicable. Otherwise, an optimal $Ra_{\mathit{eff}}$ is used. The factor Nu, as defined in Eq. (5), takes into account heat transport due to free advection as a percentage of heat transported by conduction (i.e., the conductive heat transfer). In one or more embodiments, the factor Nu is the dimensionless Nusselt number, which is the ratio of convective to conductive heat transfer across (normal to) a layer boundary. The actual thermal conductivity $\lambda$ is increased by the factor Nu to generate the equivalent thermal conductivity $\lambda_{\mathit{eff}}$. Based on the factor Nu, the equivalent thermal conductivity $\lambda_{\mathit{eff}}$ includes the actual conductive contribution and a pseudo-conductive contribution representing the advective part of heat flow. In other words, the difference between the equivalent thermal conductivity $\lambda_{\mathit{eff}}$ and the actual thermal conductivity $\lambda$ represents the advective part of heat flow as an additional pseudo-conductive heat flow of an equivalent magnitude.

In an example scenario, $\beta$ may be set to 1 for advection candidate regions without lateral layer boundaries. By setting c=1/40, Eq. (8) is derived from Eq. (4) through Eq. (7) for using in the basin modeling.

$$\lambda_{\mathit{eff},b} = \begin{cases} \lambda, & Ra < 40 \\ \lambda \cdot \dfrac{1}{40} Ra, & Ra \geq 40 \end{cases} \qquad \text{Eq. (8)}$$

As an alternative to setting c=1/40, c may be used in basin modeling as free parameter within Monte Carlo simulations to analyze the sensitivity of source rock maturity with respect to heat capacity of the fluid.

The equivalent thermal conductivity $\lambda_{\mathit{eff}}$ may also be formulated to include contributions from density driven advective heat transport. The density driven advective heat transport is part of the free advection.

Taking into account advective heat transport may result in changes of several tens of degrees in simulated temperature. In an example of petroleum generation in a source rock (e.g., type-II-shale, North Sea, Spekk formation), the transformation ratio is approximately 80% at 170° C., 50% at 160° C., and 20% at 150° C. The transformation ration is the ratio of the source already consumed to generate hydrocarbons to the total source amount. Neglecting free advection in the basin modeling may result in over-estimating or under-estimating the temperature by tens of degrees and cause substantial changes of the simulation results. For example, the simulated petroleum generation with time as well as the simulated pattern of present day hydrocarbon accumulations in the basin may be unrealistic without including the free advection in the basin modeling. In other words, embodiments of free advection in basin modeling provide more realistic simulation results of the basin modeling and petroleum system modeling.

Embodiments of free advection in basin modeling may be implemented on a computing system. Any combination of mobile, desktop, server, router, switch, embedded device, or other types of hardware may be used. For example, as shown in FIG. 4.1, the computing system (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), and numerous other elements and functionalities.

The computer processor(s) (402) may be an integrated circuit for processing instructions. For example, the computer processor(s) may be one or more cores or micro-cores of a processor. The computing system (400) may also include one or more input devices (410), such as a touchscreen, keyboard, mouse, microphone, touchpad, electronic pen, or any other type of input device.

The communication interface (412) may include an integrated circuit for connecting the computing system (400) to a network (not shown) (e.g., a local area network (LAN), a wide area network (WAN) such as the Internet, mobile network, or any other type of network) and/or to another device, such as another computing device.

Further, the computing system (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (400) in FIG. 4.1 may be connected to or be a part of a network. For example, as shown in FIG. 4.2, the network (420) may include multiple nodes (e.g., node X (422), node Y (424)). Each node may correspond to a computing system, such as the computing system shown in FIG. 4.1, or a group of nodes combined may correspond to the computing system shown in FIG. 4.1.

By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (400) may be located at a remote location and connected to the other elements over a network.

Although not shown in FIG. 4.2, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (422), node Y (424)) in the network (420) may be configured to provide services for a client device (426). For example, the nodes may be part of a cloud computing system. The nodes may include functionality to receive requests from the client device (426) and transmit responses to the client device (426). The client device (426) may be a computing system, such as the computing system shown in FIG. 4.1. Further, the client device (426) may include and/or perform at least a portion of one or more embodiments of the invention.

The computing system or group of computing systems described in FIGS. 4.1 and 4.2 may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the GUI by a user selecting one or more GUI widgets or inserting text and other data into GUI widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 4.1. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail—such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 4.1, while performing one or more embodiments of the invention, may perform data comparison. Data comparison may be used to compare two or more data values (e.g., A, B). For example, one or more embodiments may determine whether A>B, A=B, A!=B, A<B, etc. The comparison may be performed by submitting A, B, and an opcode specifying an operation related to the comparison into an arithmetic logic unit (ALU) (i. e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B includes comparing the first element of vector A with the first element of vector B, the second element of vector A with the second element of vector B, etc. In one or more embodiments, if A and B are strings, the binary values of the strings may be compared.

The computing system in FIG. 4.1 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 4.1 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents a few examples of functions performed by the computing system of FIG. 4.1 and the nodes and/or client device in FIG. 4.2. Other functions may be performed using one or more embodiments of the invention.

While one or more embodiments have been described with respect to a limited number of embodiments, those skilled in the art, having benefit of this disclosure, will appreciate that other embodiments may be devised which do not depart from the scope as disclosed herein. Accordingly, the scope should be limited by the attached claims.

What is claimed is:

1. A computer implemented method executed by at least one processor for performing a field operation of a field, comprising:
    receiving measurements of the field acquired from one or more sensor devices to generate a plurality of data items of a volume dataset;
    obtaining, for each of a plurality of cells in the volume dataset, a permeability measure to represent fluid passing ability in a corresponding location in the field;
    generating a plurality of neighboring cell combinations based on each of the plurality of neighboring cell combinations comprising a connected portion of the plurality of cells, and the permeability measure for each cell of the plurality of cells in the connected portion satisfying a pre-determined threshold;
    selecting, from the plurality of neighboring cell combinations and based at least on the permeability measure, a selected neighboring cell combination having an optimal combined free advection measure, wherein the selected neighboring cell combination corresponds to an advection candidate region of the field;
    generating an equivalent thermal conductivity for the advection candidate region;
    performing, based at least on the equivalent thermal conductivity, a basin modeling of the field to generate a modeling result representative of one or more thermal conductivity properties with respect to the field; and
    controlling one or more operations of one or more components present in the field based on the modeling result.

2. The method of claim 1, further comprising:
    obtaining the volume dataset comprising the plurality of data items representing the permeability measure and a thermal conductivity of a subterranean formation, wherein each of the plurality of data items is assigned to one of the plurality of cells in the volume dataset,
    wherein the permeability measure is obtained from the volume dataset.

3. The method of claim 1, wherein the optimal combined free advection measure is a highest combined free advection measure.

4. The method of claim 1, further comprising:
    generating a control signal based on the modeling result; and
    performing the field operation based on the control signal.

5. The method of claim 2, further comprising:
    selecting, from the plurality of cells, a plurality of neighboring cells corresponding to a sequence of vertically stacked locations in the field, wherein an additional permeability measure for each of the plurality of neighboring cells exceeds the pre-determined threshold,
    wherein generating the plurality of neighboring cell combinations comprises selecting a consecutive portion of the plurality of neighboring cells as one of the plurality of neighboring cell combinations.

6. The method of claim 5, further comprising:
    generating, based on the permeability measure and the thermal conductivity for each of the plurality of neighboring cells, a combined free advection measure for each of the plurality of neighboring cell combinations,
    wherein the combined free advection measure is proportional to a thickness and an effective permeability of the vertically stacked locations for a corresponding neighboring cell combination, and
    wherein the combined free advection measure of the selected neighboring cell combination is higher than any other combined free advection measure for the plurality of neighboring cell combinations.

7. The method of claim 6, further comprising:
    computing a ratio between the optimal combined free advection measure and a pre-determined free advection measure baseline,
    wherein generating the equivalent thermal conductivity comprises multiplying a thermal conductivity associated with the selected neighboring cell combination by the ratio.

8. A system for performing a field operation of a field, comprising:
an exploration and production (E&P) computer system, comprising:
a computer processor;
memory storing instructions executed by the computer processor, wherein the instructions comprise functionality to:
receive measurements of the field acquired from one or more sensor devices to generate a plurality of data items of a volume dataset;
obtain, for each of a plurality of cells in the volume dataset, a permeability measure to represent fluid passing ability in a corresponding location in the field;
generate a plurality of neighboring cell combinations based on each of the plurality of neighboring cell combinations comprising a connected portion of the plurality of cells, and the permeability measure for each cell of the plurality of cells in the connected portion satisfying a pre-determined threshold;
select, from the plurality of neighboring cell combinations and based at least on the permeability measure, a selected neighboring cell combination having an optimal combined free advection measure, wherein the selected neighboring cell combination corresponds to an advection candidate region of the field;
generate an equivalent thermal conductivity for the advection candidate region;
perform, based at least on the equivalent thermal conductivity, a basin modeling of the field to generate a modeling result representative of one or more thermal conductivity properties with respect to the field; and
control one or more operations of one or more components present in the field based on the modeling result; and
a repository for storing the permeability measure, the selected neighboring cell combination, and the equivalent thermal conductivity.

9. The system of claim 8, wherein the optimal combined free advection measure is a highest combined free advection measure.

10. The system of claim 8, wherein the instructions further comprise functionality to:
obtain the volume dataset comprising the plurality of data items representing the permeability measure and a thermal conductivity of the field, wherein each of the plurality of data items is assigned to one of the plurality of cells in the volume dataset,
wherein the permeability measure is obtained from the volume dataset.

11. The system of claim 8, further comprising:
field equipment coupled to the E&P computer system and configured to perform the field operation based on a control signal,
wherein the instructions further comprise functionality to generate the control signal based on the modeling result.

12. The system of claim 8, wherein the instructions further comprise functionality to:
select, from the plurality of cells, a plurality of neighboring cells corresponding to a sequence of vertically stacked locations in the field, wherein an additional permeability measure for each of the plurality of neighboring cells exceeds the pre-determined threshold,
wherein generating the plurality of neighboring cell combinations comprises selecting a consecutive portion of the plurality of neighboring cells as one of the plurality of neighboring cell combinations.

13. The system of claim 8, wherein the instructions further comprise functionality to:
generate, based on the permeability measure and the thermal conductivity for each of the plurality of neighboring cells, a combined free advection measure for each of the plurality of neighboring cell combinations,
wherein the combined free advection measure is proportional to a thickness and an effective permeability of the vertically stacked locations for a corresponding neighboring cell combination, and
wherein the combined free advection measure of the selected neighboring cell combination is higher than any other combined free advection measure for the plurality of neighboring cell combinations.

14. The system of claim 8, wherein the instructions further comprise functionality to:
compute a ratio between the optimal combined free advection measure and a pre-determined conduction measure baseline,
wherein generating the equivalent thermal conductivity comprises multiplying a thermal conductivity associated with the selected neighboring cell combination by the ratio.

15. A non-transitory computer readable medium storing instructions that are configured to cause a computer processor to:
receive measurements of the field acquired from one or more sensor devices to generate a plurality of data items of a volume dataset;
obtain, for each of a plurality of cells in the volume dataset, a permeability measure to represent fluid passing ability in a corresponding location in the field;
generate a plurality of neighboring cell combinations based on each of the plurality of neighboring cell combinations comprising a connected portion of the plurality of cells, and the permeability measure for each cell of the plurality of cells in the connected portion satisfying a pre-determined threshold;
select, from the plurality of neighboring cell combinations and based at least on the permeability measure, a selected neighboring cell combination having an optimal combined free advection measure, wherein the selected neighboring cell combination corresponds to an advection candidate region of the field;
generate an equivalent thermal conductivity for the advection candidate region;
perform, based at least on the equivalent thermal conductivity, a basin modeling of the field to generate a modeling result representative of one or more thermal conductivity properties with respect to the field; and
control one or more operations of one or more components present in the field based on the modeling result.

16. The computer readable medium of claim 15, wherein the instructions are further configured to cause the computer processor to:
obtain the volume dataset comprising the plurality of data items representing the permeability measure and a thermal conductivity of a subterranean formation, wherein each of the plurality of data items is assigned to one of the plurality of cells in the volume dataset, wherein the permeability measure is obtained from the volume dataset.

17. The computer readable medium of claim 15, wherein the optimal combined free advection measure is a highest combined free advection measure.

18. The computer readable medium of claim 15, wherein the instructions are further configured to cause the computer processor to:

generate a control signal based on the modeling result; and perform the field operation based on the control signal.

19. The computer readable medium of claim 15, wherein the instructions are further configured to cause the computer processor to:

select, from the plurality of cells, a plurality of neighboring cells corresponding to a sequence of vertically stacked locations in the field, wherein and additional permeability measure for each of the plurality of neighboring cells exceeds the pre-determined threshold.

20. The computer readable medium of claim 19, wherein the instructions are further configured to cause the computer processor to:

generate, based on the permeability measure and the thermal conductivity for each of the plurality of neighboring cells, a combined free advection measure for each of the plurality of neighboring cell combinations.

* * * * *